United States Patent
Hayashi et al.

(10) Patent No.: US 10,377,267 B2
(45) Date of Patent: Aug. 13, 2019

(54) VEHICLE

(71) Applicant: YAMAHA HATSUDOKI KABUSHIKI KAISHA, Iwata-shi, Shizuoka (JP)

(72) Inventors: Tomoyuki Hayashi, Shizuoka (JP); Kazuo Sunahiro, Shizuoka (JP); Fumihiro Hidaka, Shizuoka (JP)

(73) Assignee: YAMAHA HATSUDOKI KABUSHIKI KAISHA, Shizouka (JP)

( * ) Notice: Subject to any disclaimer, the term of this patent is extended or adjusted under 35 U.S.C. 154(b) by 153 days.

(21) Appl. No.: 15/279,547

(22) Filed: Sep. 29, 2016

(65) Prior Publication Data
US 2017/0015216 A1 Jan. 19, 2017

Related U.S. Application Data

(63) Continuation of application No. 14/666,646, filed on Mar. 24, 2015, now Pat. No. 9,475,413.

(30) Foreign Application Priority Data

Mar. 25, 2014 (JP) ................... 2014-062558

(51) Int. Cl.
*B60N 2/01* (2006.01)
*B60R 22/18* (2006.01)
(Continued)

(52) U.S. Cl.
CPC .................. *B60N 2/01* (2013.01); *B60N 2/38* (2013.01); *B60N 2/64* (2013.01); *B60N 2/68* (2013.01);
(Continued)

(58) Field of Classification Search
CPC ....... B60R 22/023; B60R 21/13; B60R 22/18; B60R 22/34; B60N 2/4802; B60N 2/449;
(Continued)

(56) References Cited

U.S. PATENT DOCUMENTS 5,280,995 A * 1/1994 Elton ................... B60N 2/3084
280/807
6,065,798 A * 5/2000 Sankrithi ................ B60P 3/423
296/181.1

(Continued)

OTHER PUBLICATIONS

Hayashi et al., "Vehicle", U.S. Appl. No. 14/666,646, filed Mar. 24, 2015.

*Primary Examiner* — Paul N Dickson
*Assistant Examiner* — Timothy Wilhelm
(74) *Attorney, Agent, or Firm* — Keating and Bennett, LLP

(57) ABSTRACT

A vehicle includes a pair of support portions that connect a frame portion and a roll-over protection cage to each other; a cross member that extends in a width direction of the vehicle and connects the pair of support portions to each other at positions higher than centers of the pair of support portions in an up-down direction of the vehicle; a first seat portion, a second seat portion, and a third seat portion in a front row; and a seat belt unit corresponding to the second seat portion. The seat belt unit includes a winding device located at a position lower than a shoulder anchor. The cross member is located between an upper end of the shoulder anchor and a lower end of the winding device in a front view of the vehicle, and supports the shoulder anchor and the winding device.

8 Claims, 16 Drawing Sheets

(51) Int. Cl.
    *B60N 2/38*   (2006.01)
    *B60R 21/13*  (2006.01)
    *B60N 2/68*   (2006.01)
    *B60N 2/64*   (2006.01)
    *B60R 22/34*  (2006.01)
    *B60N 2/90*   (2018.01)
    *B60N 2/803*  (2018.01)

(52) U.S. Cl.
    CPC .............. *B60N 2/682* (2013.01); *B60N 2/688* (2013.01); *B60N 2/803* (2018.02); *B60N 2/986* (2018.02); *B60R 21/13* (2013.01); *B60R 22/18* (2013.01); *B60R 22/34* (2013.01); *B60R 2022/3402* (2013.01)

(58) Field of Classification Search
    CPC .......... B60N 2/68; B60N 2/682; B60N 2/688; B60N 2/38; B60N 2022/3402; B60N 2/01; B60N 2/986; B60N 2/803; B60N 2/64
    See application file for complete search history.

(56) References Cited

U.S. PATENT DOCUMENTS

| | | | |
|---|---|---|---|
| 6,209,943 B1 * | 4/2001 | Neale | B60N 2/3015 296/65.01 |
| 6,533,320 B1 * | 3/2003 | Langensiepen | B60R 22/02 280/801.1 |
| 7,338,076 B2 * | 3/2008 | Hamamoto | B60R 21/13 280/756 |
| 7,735,895 B2 * | 6/2010 | Brown | B60N 2/06 296/65.01 |
| 7,841,639 B2 * | 11/2010 | Tanaka | B60N 2/3031 296/183.2 |
| 8,328,235 B2 * | 12/2012 | Schneider | B60J 5/0487 280/748 |
| 8,499,870 B2 * | 8/2013 | Nakamura | F02M 35/048 180/68.3 |
| 8,550,500 B2 * | 10/2013 | Yamamoto | B60R 22/24 280/749 |
| 8,628,135 B2 * | 1/2014 | Valasin | B60N 2/01583 248/503.1 |
| 8,876,162 B2 * | 11/2014 | Shinbori | B60R 21/13 280/756 |
| 8,944,465 B2 * | 2/2015 | Shinbori | B60N 2/01 280/756 |
| 8,998,255 B1 * | 4/2015 | Shinbori | B60N 2/01 280/756 |
| 9,045,104 B2 * | 6/2015 | Kuroda | B60R 21/13 |
| 9,475,413 B2 * | 10/2016 | Hayashi | B60R 22/18 |
| 9,815,432 B2 * | 11/2017 | Kuroda | B60R 22/023 |
| 2006/0049682 A1 * | 3/2006 | Yamanaka | B60N 2/065 297/452.18 |
| 2008/0061542 A1 * | 3/2008 | Froschle | B60R 21/13 280/756 |
| 2012/0217078 A1 * | 8/2012 | Kinsman | B60R 21/13 180/69.4 |
| 2013/0256050 A1 * | 10/2013 | Novotny | B60R 21/13 180/271 |
| 2014/0110988 A1 * | 4/2014 | Nakanishi | B60N 2/688 297/481 |
| 2014/0124279 A1 * | 5/2014 | Schlangen | B60G 3/20 180/68.4 |
| 2014/0353956 A1 * | 12/2014 | Bjerketvedt | B60N 3/06 280/756 |

* cited by examiner

VEHICLE

BACKGROUND OF THE INVENTION

1. Field of the Invention

The present invention relates to vehicles, and more specifically to a vehicle including a front row and a rear row of seats arranged in a fore-aft direction.

2. Description of the Related Art

There is disclosed a large variety of multi-purpose four-wheel vehicles capable of driving on uneven terrain.

For example, United States Patent Application Laid Open No. 2010/0314191 A1 discloses a vehicle, which includes a pair of front wheels, a pair of rear wheels, a frame, a roll-over protection cage, and seats. The frame supports the front wheels, the rear wheels, the roll-over protection cage, and the seats. The seats are configured so that two persons sit side by side in a width direction of the vehicle in a front row, and two persons as well in a rear row.

Aside from such a vehicle described above, there are also vehicles configured so that three persons sit side by side in the width direction of the vehicle in a front row and three persons as well in a rear row. A problem, however, with this vehicle is that when the vehicle makes rolling movements, the person sitting in the middle tends to make contact with the other two persons sitting on his/her sides. This can degrade the riding comfort of the person sitting in the middle. Therefore, a seat belt unit is required for a passenger who sits in the middle of the front row.

However, there is a problem of where and how to attach a winding device and a shoulder anchor of the seat belt unit for the passenger sitting in the middle of the front row. It is difficult to make an appropriate arrangement to securely attach these members while maintaining the riding comfort of the passengers in the rear row.

SUMMARY OF THE INVENTION

Therefore, preferred embodiments of the present invention provide a vehicle that allows secure attachment of a winding device and a shoulder anchor of the seat belt unit for the passenger sitting in the middle of the front row while maintaining the riding comfort of the passengers in the rear row.

According to a preferred embodiment of the present invention, a vehicle includes a front row and a rear row arranged in a fore-aft direction of the vehicle. The vehicle includes a pair of front wheels; at least a pair of rear wheels; a frame portion supporting the pair of front wheels and the pair of rear wheels; a roll-over protection cage disposed above the front row and the rear row, and supported by the frame portion; a pair of support portions extending in an up-down direction of the vehicle on a left side and a right side in a width direction of the vehicle, and connecting the frame portion and the roll-over protection cage to each other; a cross member extending in the width direction of the vehicle between the front row and the rear row, and connecting the pair of support portions to each other; a first seat portion, a second seat portion, and a third seat portion arranged in the width direction of the vehicle in the front row and supported by the frame portion; and a seat belt unit provided to the second seat portion. In this vehicle, the second seat portion is between the first seat portion and the third seat portion. The seat belt unit includes a belt member; a winding device to wind the belt member; a shoulder anchor slidably supporting the belt member drawn out of the winding device; and a buckle portion located at an obliquely downward position from the shoulder anchor in a front view of the vehicle to fix the belt member. The winding device is located at a position lower than the shoulder anchor; the cross member connects the pair of support portions to each other at a position higher than centers, in the up-down direction, of the pair of support portions; and the cross member is located between an upper end of the shoulder anchor and a lower end of the winding device in the front view of the vehicle, and supports the shoulder anchor and the winding device.

According to a preferred embodiment of the present invention, a pair of support portions that extend in the up-down direction connect the frame portion and the roll-over protection cage to each other, and are connected to each other by the cross member. This improves the rigidity of the vehicle as a whole and securely fixes the cross member in the vehicle even if the vehicle is increased in size in the fore-aft direction by including a front row and a rear row arranged in the fore-aft direction. The cross member that is securely fixed in the vehicle is located, in the front view, between an upper end of the shoulder anchor for a passenger sitting at the center in the front row and a lower end of the winding device therefor. Therefore, it is possible to dispose both of the shoulder anchor and the winding device adjacent the cross member, and to securely support the shoulder anchor and the winding device provided for the passenger in the center of the front row by the cross member. The cross member extends in the width direction of the vehicle between the front row and the rear row, while the cross member connects the pair of support portions to each other at positions higher than the centers, in the up-down direction, of the pair of support portions. This makes it possible to dispose the cross member sufficiently above seat surfaces of the seat portions in the rear row. As a result, it is also possible to dispose the winding device that is located at a position lower than the cross member, sufficiently above the seat surfaces of the seat portions in the rear row; in other words, neither of the cross member and the winding device for the passenger sitting at the center in the front row is disposed at a position lower than the knees of the passengers sitting in the rear row. This arrangement ensures the riding comfort of the passengers in the rear row. As described above, it is possible to securely attach the winding device and the shoulder anchor of the seat belt unit for the passenger sitting in the middle of the front row while ensuring the riding comfort of the passengers in the rear row.

Preferably, the vehicle further includes a first support portion that is preferably U-shaped or substantially U-shaped and includes two end portions connected to the cross member, and a second support portion that is preferably U-shaped or substantially U-shaped and includes two end portions connected to the cross member. With the above arrangement, the shoulder anchor is supported by the cross member via the first support portion, and the winding device is supported by the cross member via the second support portion. In this case, each of the first support portion and the second support portion is securely connected to the cross member at two locations, i.e., at both end portions thereof. Also, each of the first support portion and the second support portion preferably has a shape like the letter U. This makes it possible to attach the shoulder anchor to the first support portion so as not to protrude outward beyond an outer perimeter of the first support portion, and to attach the winding device to the second support portion so as not to protrude outward beyond an outer perimeter of the second support portion. Therefore, it is possible to protect the shoulder anchor and the winding device.

Further preferably, the vehicle further includes a grab bar including an end portion attached to the cross member. By attaching an end portion of the grab bar to the cross member in such a manner as described above, it is possible to fix the position of the end portion of the grab bar, and to prevent the grab bar from protruding in the width direction of the vehicle.

Further, preferably, the grab bar includes another end portion attached to the second support portion. In this case, it is possible to mutually enhance the connection strength of the grab bar and the second support portion to the cross member.

Preferably, the vehicle further includes a fastener connecting the support portion and the cross member to each other. In this case, it is easy to remove the cross member from the support portion when the vehicle is to be transported. This makes transportation of the vehicle easy.

Further preferably, the second seat portion includes a headrest portion, and the cross member overlaps the headrest portion in the front view. In this case, it becomes possible to easily support the headrest portion of the second seat portion in the front row by the cross member.

Further, preferably, the vehicle further includes a steering wheel in front of the first seat portion, and with this arrangement, the shoulder anchor and the winding device are disposed adjacent the first seat portion in the width direction of the vehicle. In this case, the shoulder anchor and the winding device are on a side closer to the first seat portion when viewed from the second seat portion, and therefore, the arrangement sufficiently reduces sway of the passenger sitting in the second seat portion toward the first seat portion. Thus, the driver drives the vehicle more comfortably.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
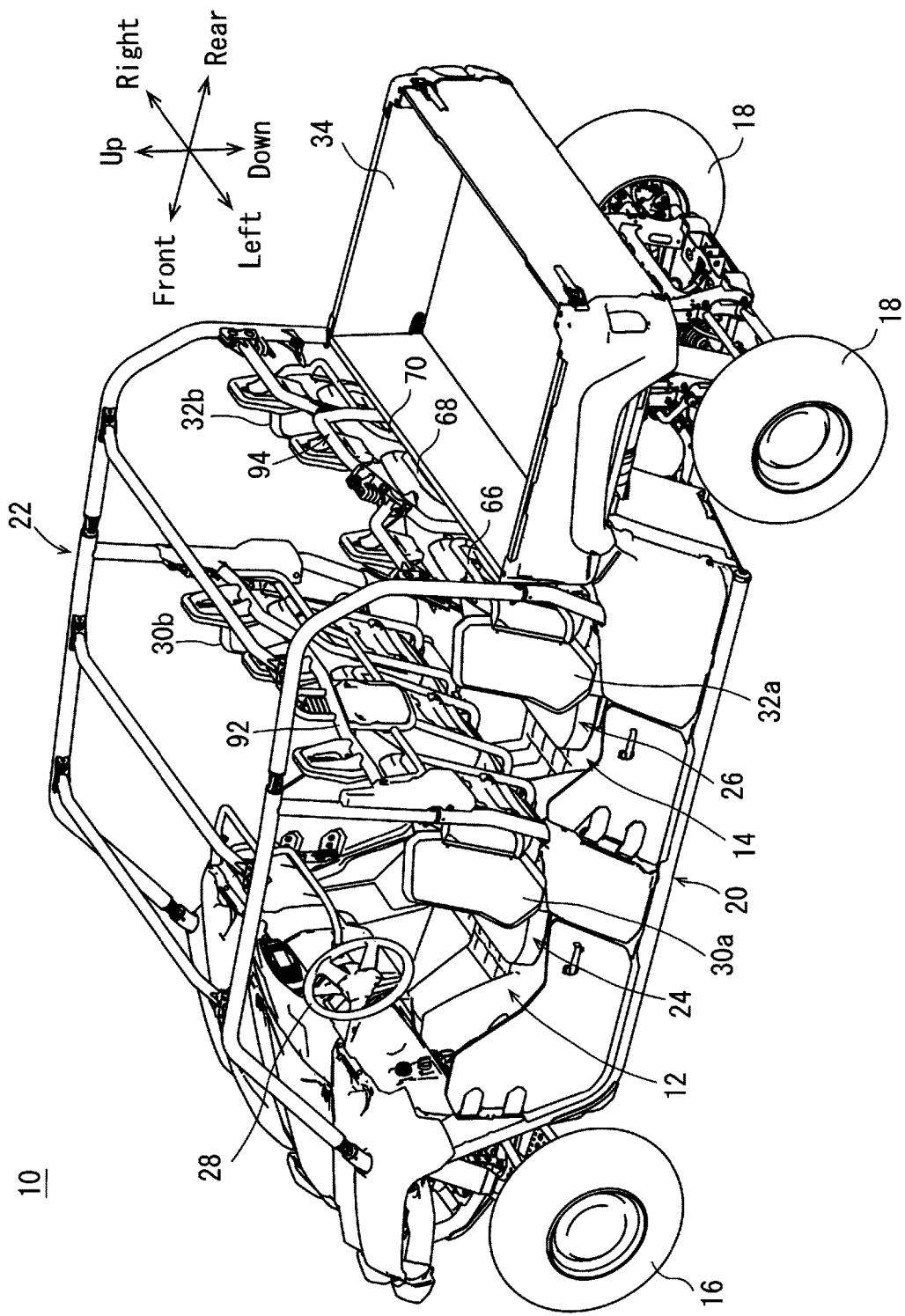
FIG. 1 is a perspective view of a vehicle according to a preferred embodiment of the present invention.
Figure 2:
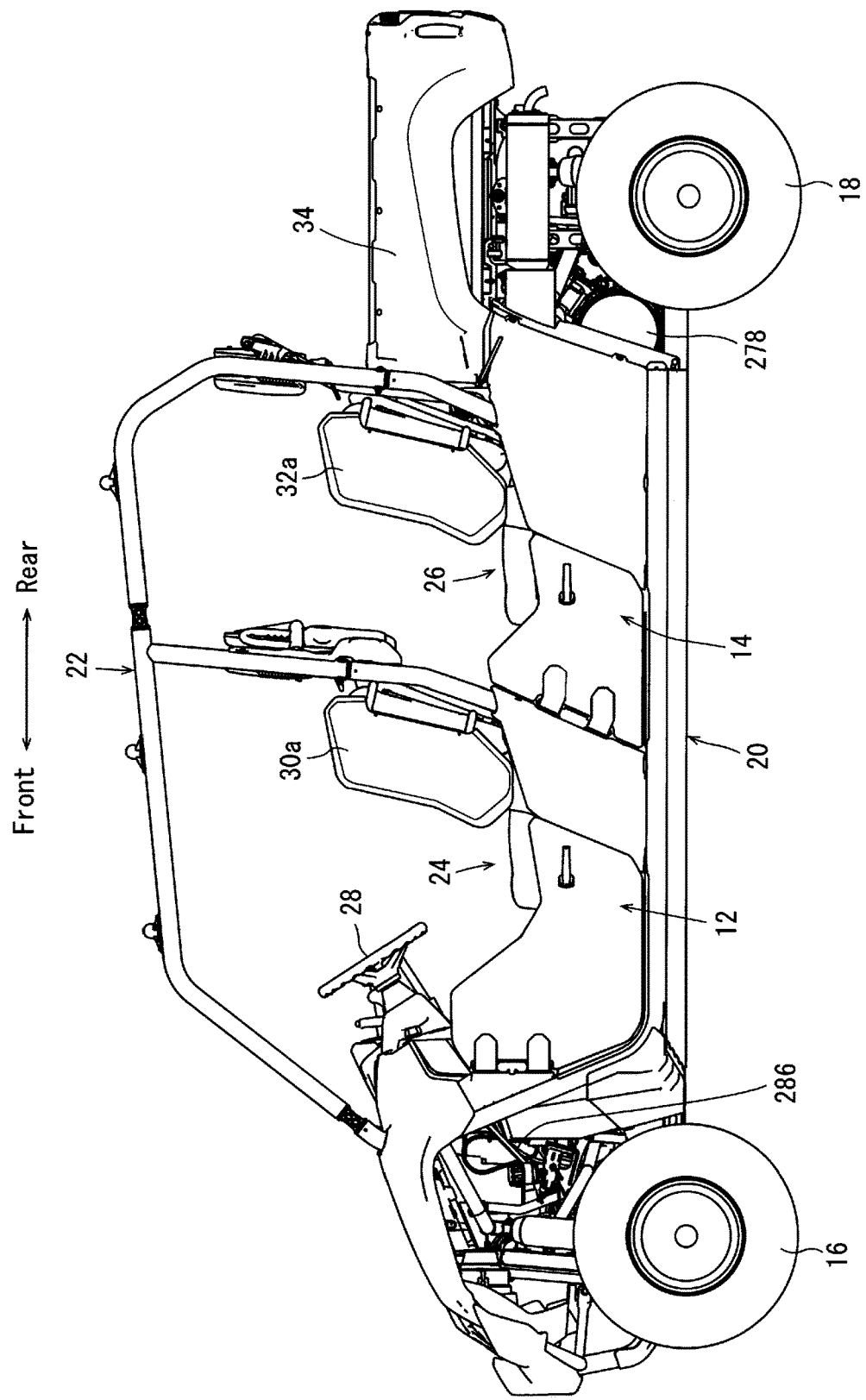
FIG. 2 is a side view of the vehicle.
Figure 3:
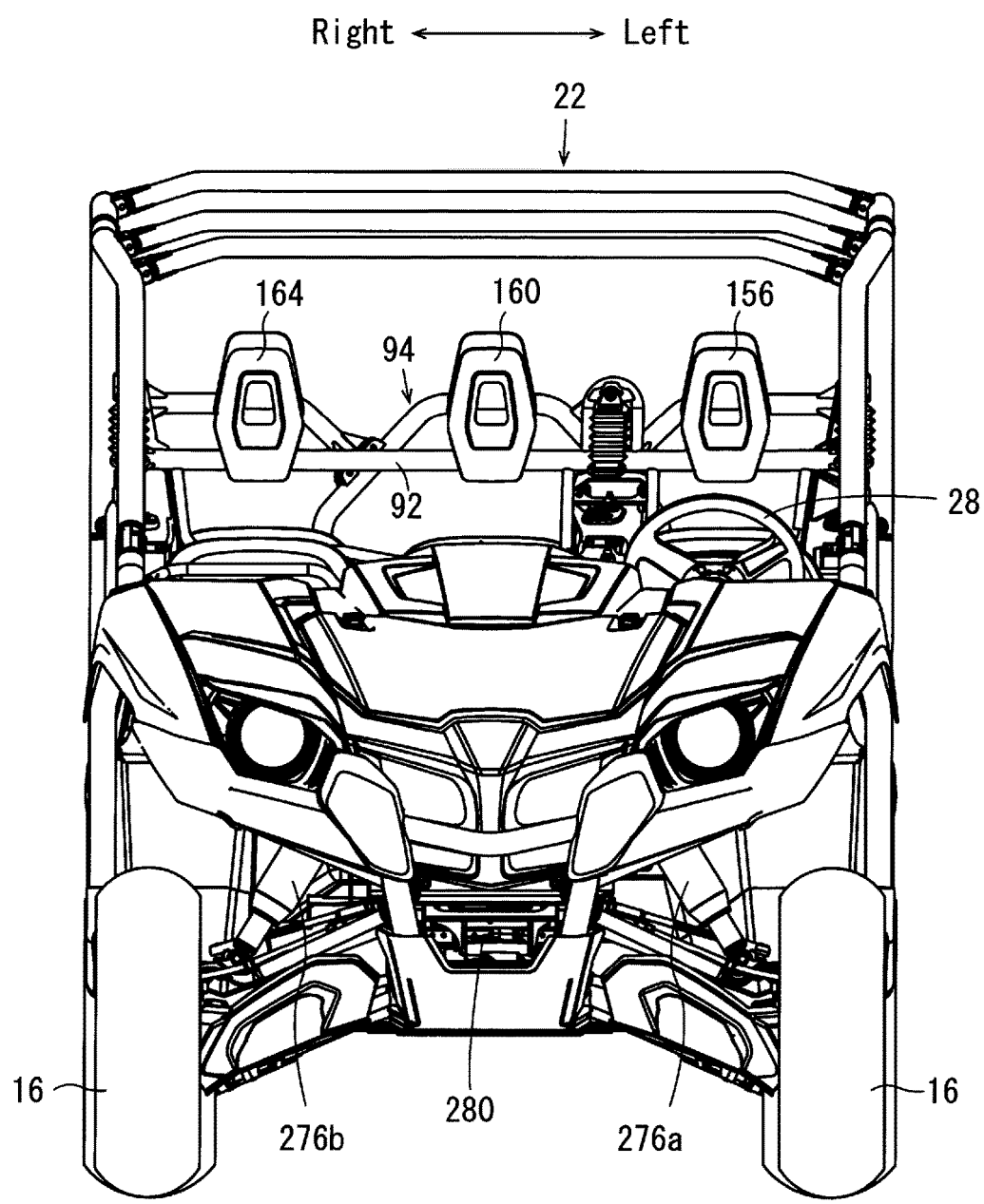
FIG. 3 is a front view of the vehicle.

Hereinafter, preferred embodiments of the present invention will be described with reference to the drawings. It is noted that the terms front and rear, right and left, up and down as used in preferred embodiments of the present invention are determined from the driver's position on a seat portion 136 of a vehicle 10, with the driver facing toward a steering wheel 28.

Referring to FIG. 1 through FIG. 4, a vehicle 10 according to a preferred embodiment of the present invention is preferably a four-wheel drive multi-purpose vehicle configured to haul six people, and includes a front row 12 and a rear row 14 arranged in a fore-aft direction of the vehicle. The vehicle 10 includes a pair of front wheels 16; a pair of rear wheels 18; a frame portion 20; a roll-over protection cage 22; a seat unit 24 in the front row 12; a seat unit 26 in the rear row 14; a steering wheel 28; a pair of shoulder bolsters 30a, 30b for the front row 12, a pair of shoulder bolsters 32a, 32b for the rear row 14, and a cargo bed 34.

The frame portion 20 supports the pair of front wheels 16, the pair of rear wheels 18, the roll-over protection cage 22, the seat units 24, 26, the shoulder bolsters 30a, 30b, 32a, 32b and the cargo bed 34.

Referring to FIG. 5 through FIG. 9, the frame portion 20 includes a main frame portion 36, a front frame portion 38 in front of the main frame portion 36, and a rear frame portion 40 at a rear of the main frame portion 36. The main frame portion 36 includes a rectangular or substantially rectangular plate frame portion 42; a pair of L-shaped or substantially L-shaped support frame portions 44a, 44b; a pair of support frame portions 46a, 46b; a cross member 48; a seat frame portion 50 in the front row; and a seat frame portion 52 in the rear row.

The pair of support frame portions 44a, 44b extend in the fore-aft direction of the vehicle 10 on both sides of the plate frame portion 42 in the width direction of the vehicle 10. The pair of support frame portions 44a, 44b include front portions extending obliquely forward and upward, with their tip portions slightly curving rearward. The pair of support frame portions 46a, 46b extend upward while slightly tilting rearward from respective rear regions of the pair of support frame portions 44a, 44b. The cross member 48 extends in a left-right direction of the vehicle 10, and connects the pair of support frame portions 46a, 46b to each other adjacent their respective center regions via brackets 54a, 54b. The seat frame portion 50 in the front row includes frame lower portions 56a, 56b arranged in the left-right direction of the vehicle 10; and frame upper portions 58, 60, 62 arranged in the left-right direction of the vehicle 10 at a position higher than the frame lower portions 56a, 56b. The seat frame portion 52 in the rear row is located at a position more rearward than the seat frame portion 50 in the front row, and includes frame lower portions 64a, 64b arranged in the left-right direction of the vehicle 10, and frame upper portions 66, 68, 70 (see FIG. 1) arranged in the left-right direction of the vehicle 10 at a position higher than the frame lower portions 64a, 64b.

The roll-over protection cage 22 is disposed above the front row 12, the rear row 14, and the steering wheel 28.

Figure 6:
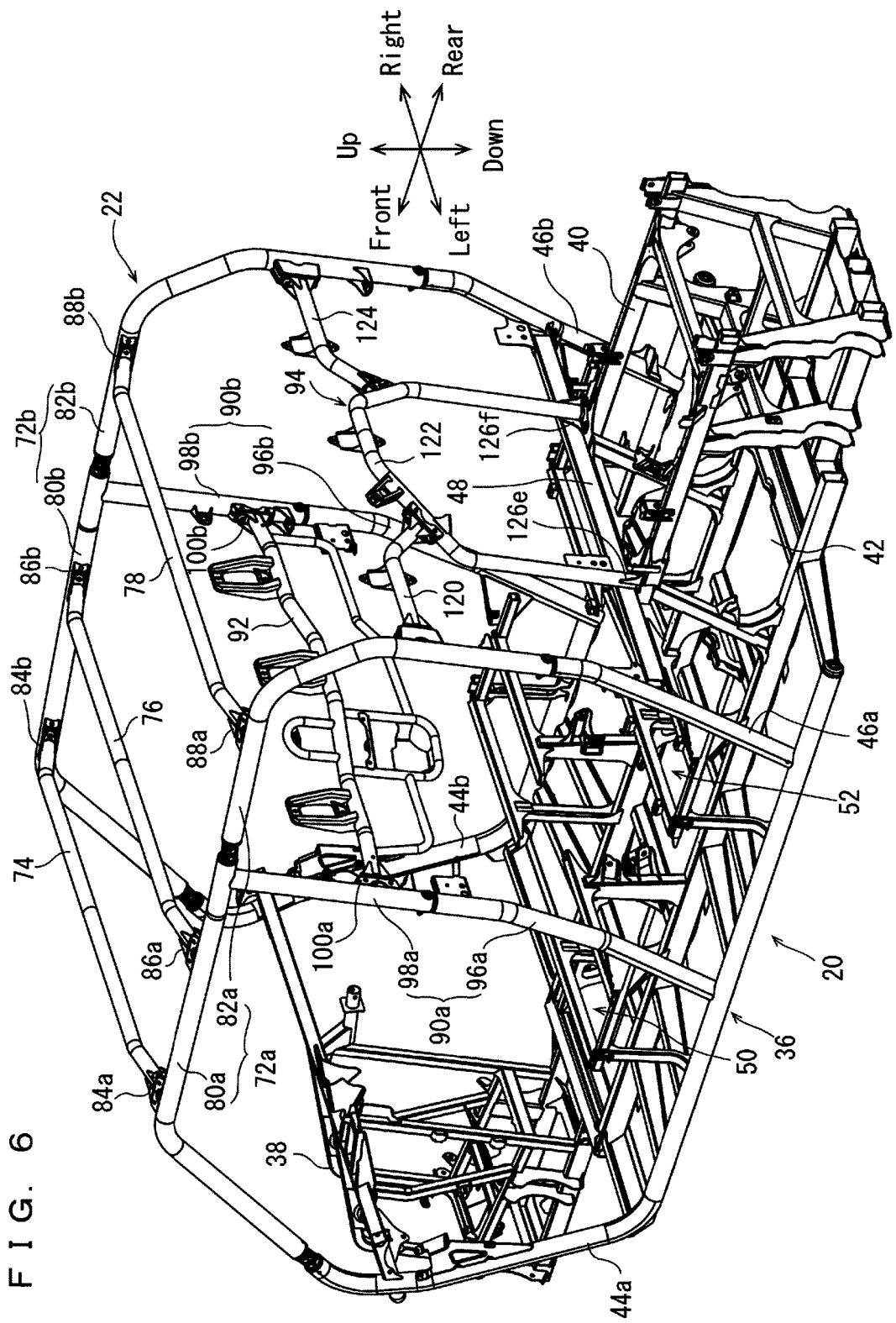
FIG. 6 is a perspective view of the frame portion and the roll-over protection cage.
Figure 7:
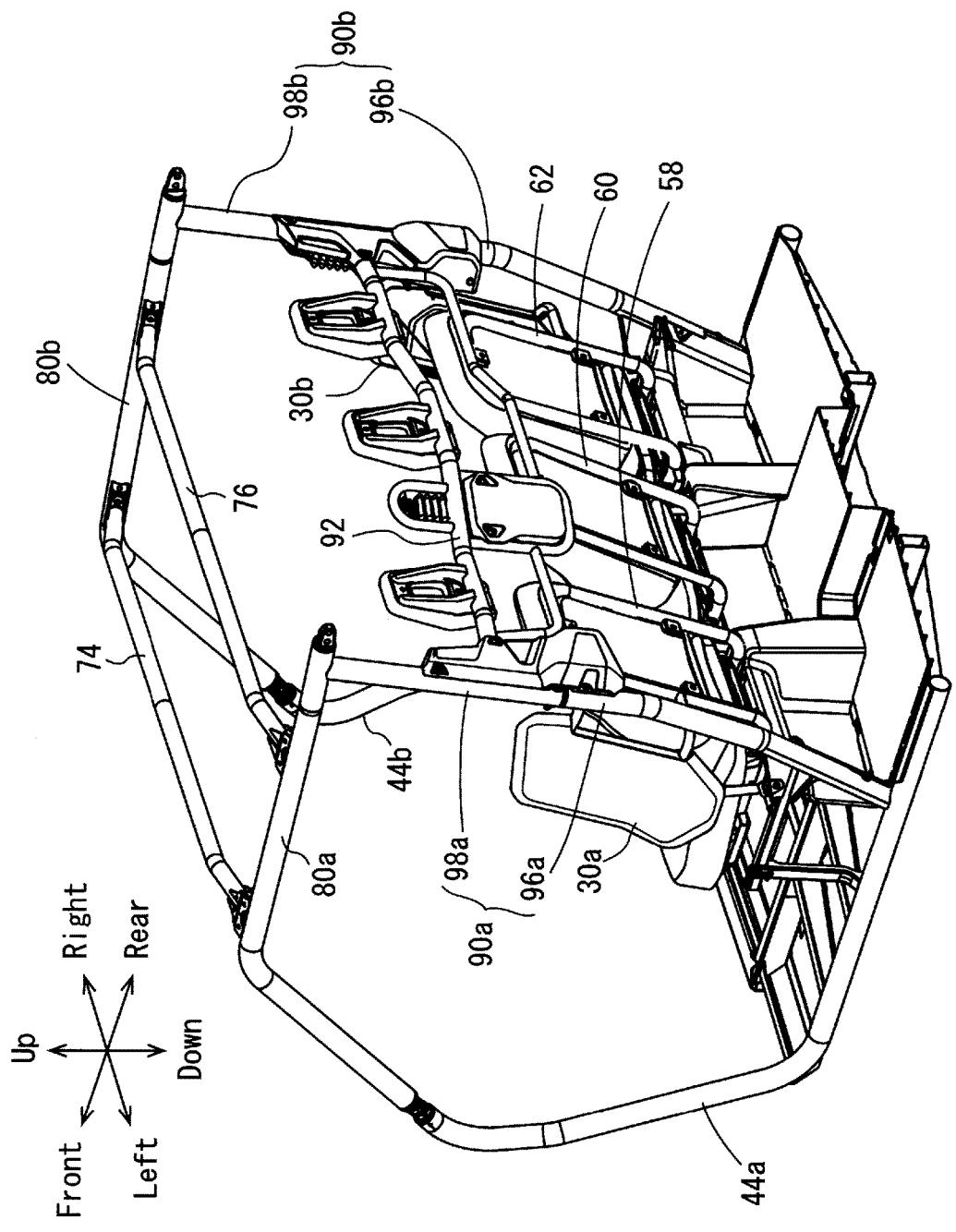
FIG. 7 is a perspective view of the frame portion, a front portion of the roll-over protection cage, a seat unit in a front row, and their surroundings.
Figure 8:
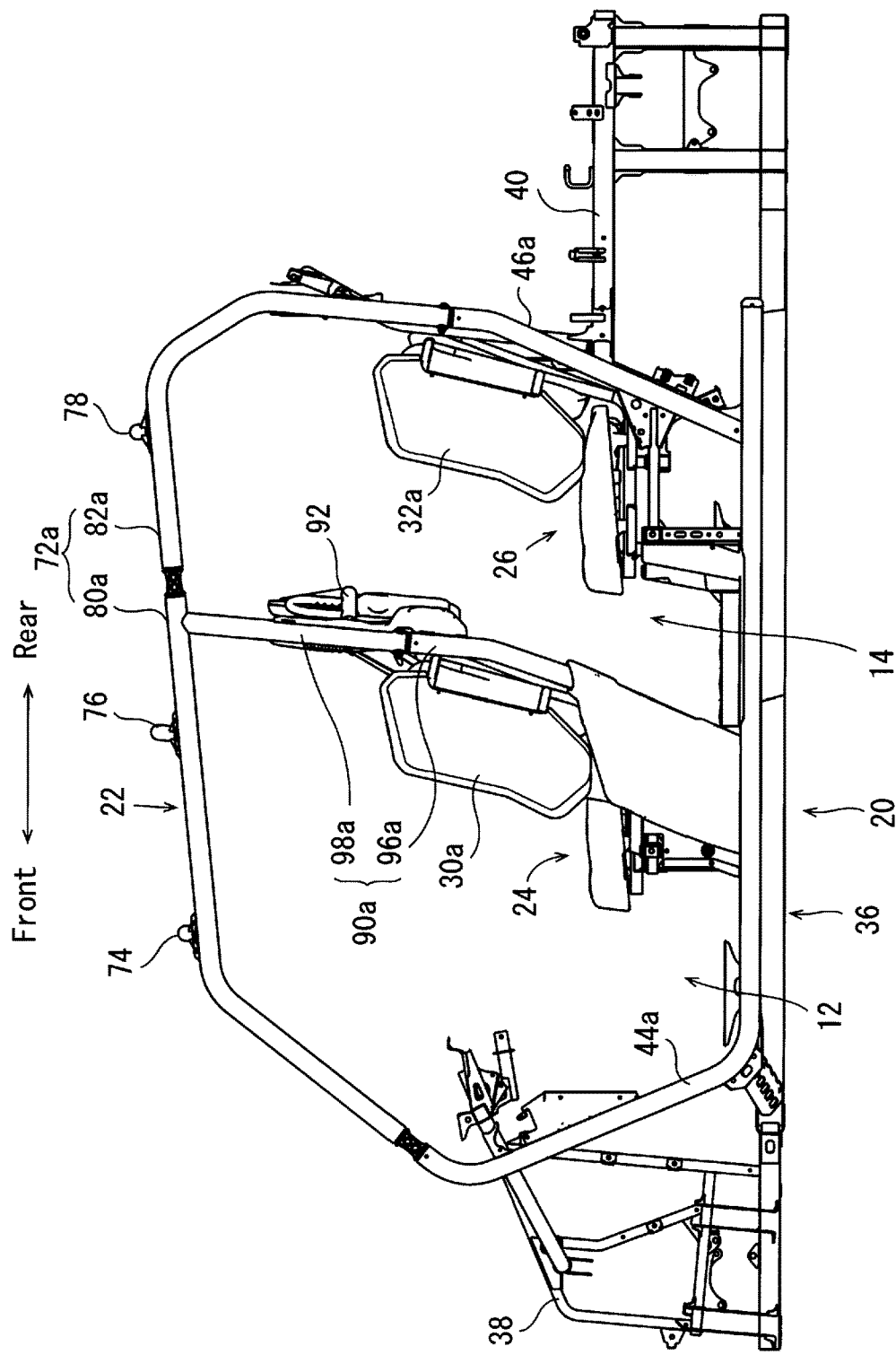
FIG. 8 is a side view of the frame portion, the roll-over protection cage, and their surroundings.

Referring to FIG. 6, the roll-over protection cage 22 includes a pair of side cage portions 72a, 72b extending in the fore-aft direction, and roof members 74, 76, 78 extending in the left-right direction.

The pair of side cage portions 72a, 72b are preferably each U-shaped or substantially U-shaped in a side view, and include cage fore portions 80a, 80b and cage rear portions 82a, 82b, respectively. The cage fore portions 80a, 80b include rear end portions connected to respective front end portions of the cage rear portions 82a, 82b. The cage fore portions 80a, 80b include lower end portions (fore end portions) connected to respective upper end portions (fore end portions) of the support frame portions 44a, 44b. The cage rear portions 82a, 82b include lower end portions (rear end portions) connected to respective upper end portions (rear end portions) of the support frame portions 46a, 46b. The support frame portions 44a, 44b and the cage fore portions 80a, 80b are connected to each other, respectively; the cage fore portions 80a, 80b and the cage rear portions 82a, 82b are connected to each other; and the cage rear portions 82a, 82b and the support frame portions 46a, 46b are connected to each other. Each connection is made by fasteners (including bolts and nuts), for example.

Each of the roof members 74, 76, 78 connects an upper portion of the side cage portion 72a and an upper portion of the side cage portion 72b. Specifically, the roof members 74, 76, 78 are disposed from front to rear in this order. The roof member 74 connects an upper portion of the cage fore portion 80a and an upper portion of the cage fore portion 80b to each other via connecting portions 84a, 84b; the roof member 76 connects the upper portion of the cage fore portion 80a and the upper portion of the cage fore portion 80b to each other via connecting portions 86a, 86b; and the roof member 78 connects an upper portion of the cage rear portion 82a and an upper portion of the cage fore portion 82b to each other via connecting portions 88a, 88b.

The vehicle 10 further includes a pair of support portions 90a, 90b, and cross members 92, 94.

The pair of support portions 90a, 90b preferably have a rod shape, and connect the frame portion 20 and the roll-over protection cage 22 to each other. The pair of support portions 90a, 90b are adjacent to a rear region of the seat frame portion 50 in the front row 12 in the fore-aft direction of the vehicle 10, extend in the up-down direction on the left and on the right sides in the width direction of the vehicle 10, and connect the pair of support frame portions 44a, 44b and the pair of side cage portions 72a, 72b to each other. Specifically, the pair of support portions 90a, 90b include lower support portions 96a, 96b and upper support portions 98a, 98b, respectively. The lower support portions 96a, 96b include upper end portions connected to respective lower end portions of the upper support portions 98a, 98b. The lower support portions 96a, 96b include lower end portions connected to the support frame portions 44a, 44b, respectively, at central regions or substantially central regions of the plate frame portion 42 in the fore-aft direction. The upper support portions 98a, 98b include upper end portions, respectively, connected to rear-end regions of the cage fore portions 80a, 80b. The lower support portions 96a, 96b include upper end portions connected to lower end portions of the upper support portions 98a, 98b by fasteners (including bolts and nuts), for example. The lower support portions 96a, 96b include lower end portions connected to the support frame portions 44a, 44b, whereas the upper support portions 98a, 98b include upper end portions connected to rear-end regions of the cage fore portions 80a, 80b. These connections are made by welds, for example.

Figure 9:
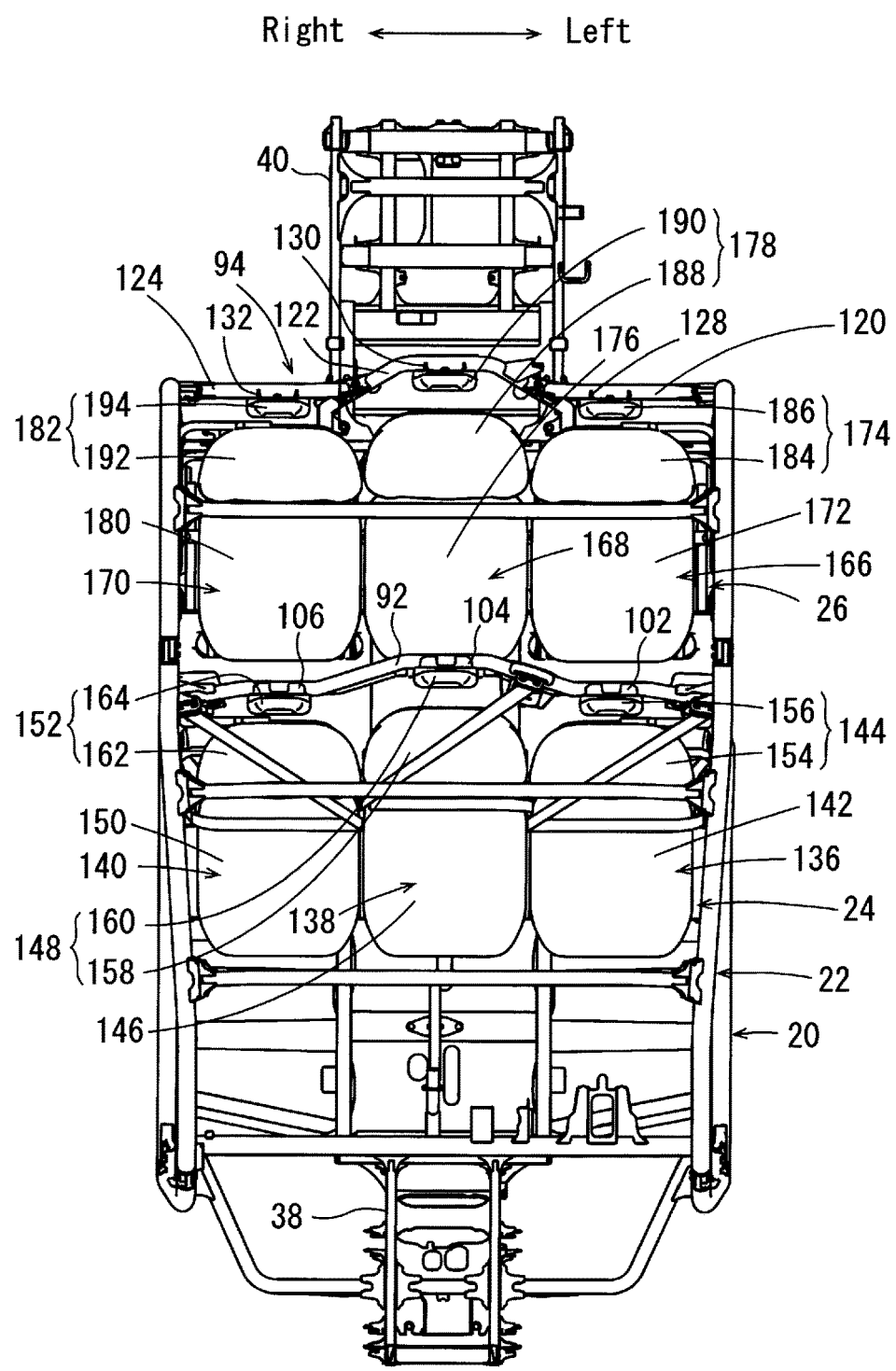
FIG. 9 is a plan view of the frame portion, the roll-over protection cage, and their surroundings.
Figure 10:
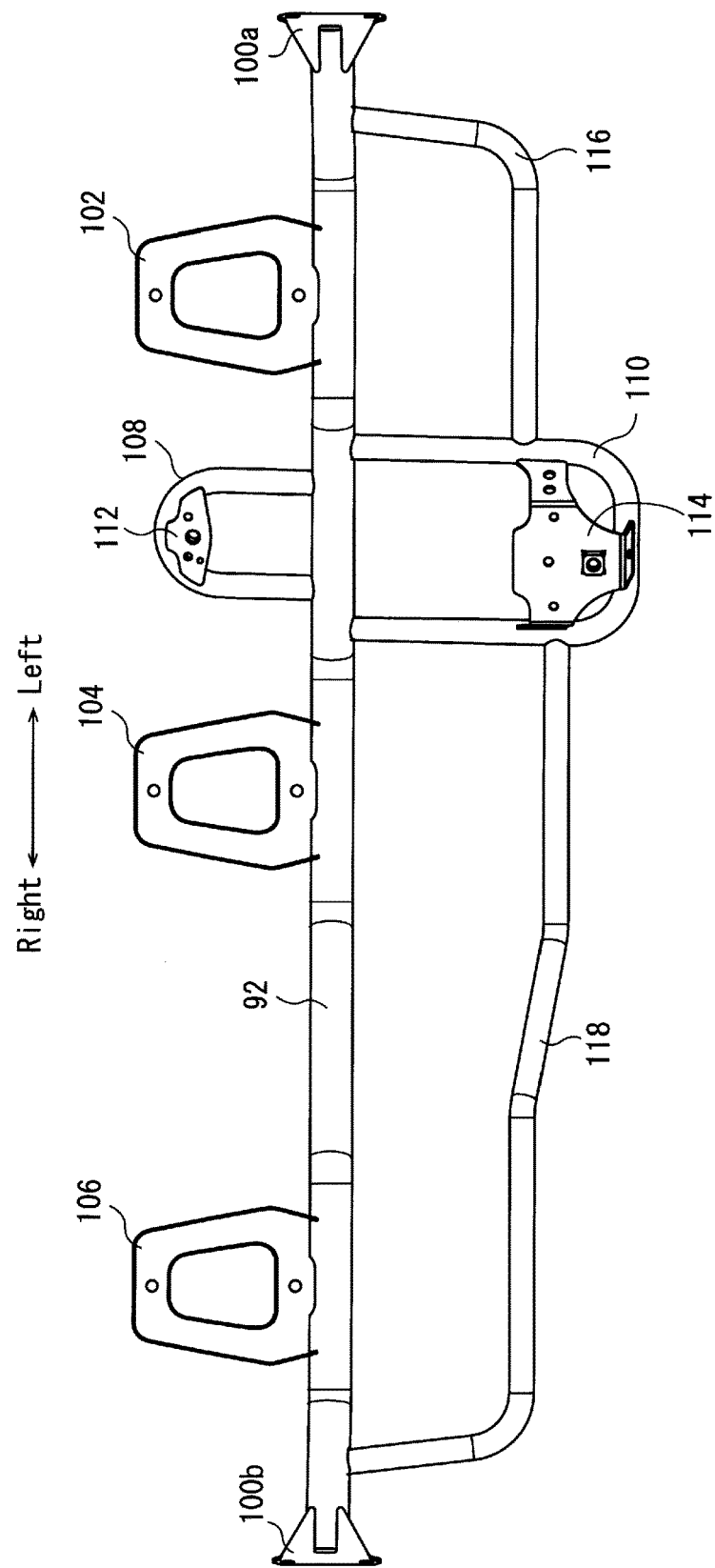
FIG. 10 is a front view of a cross member and surroundings thereof.
Figure 11:
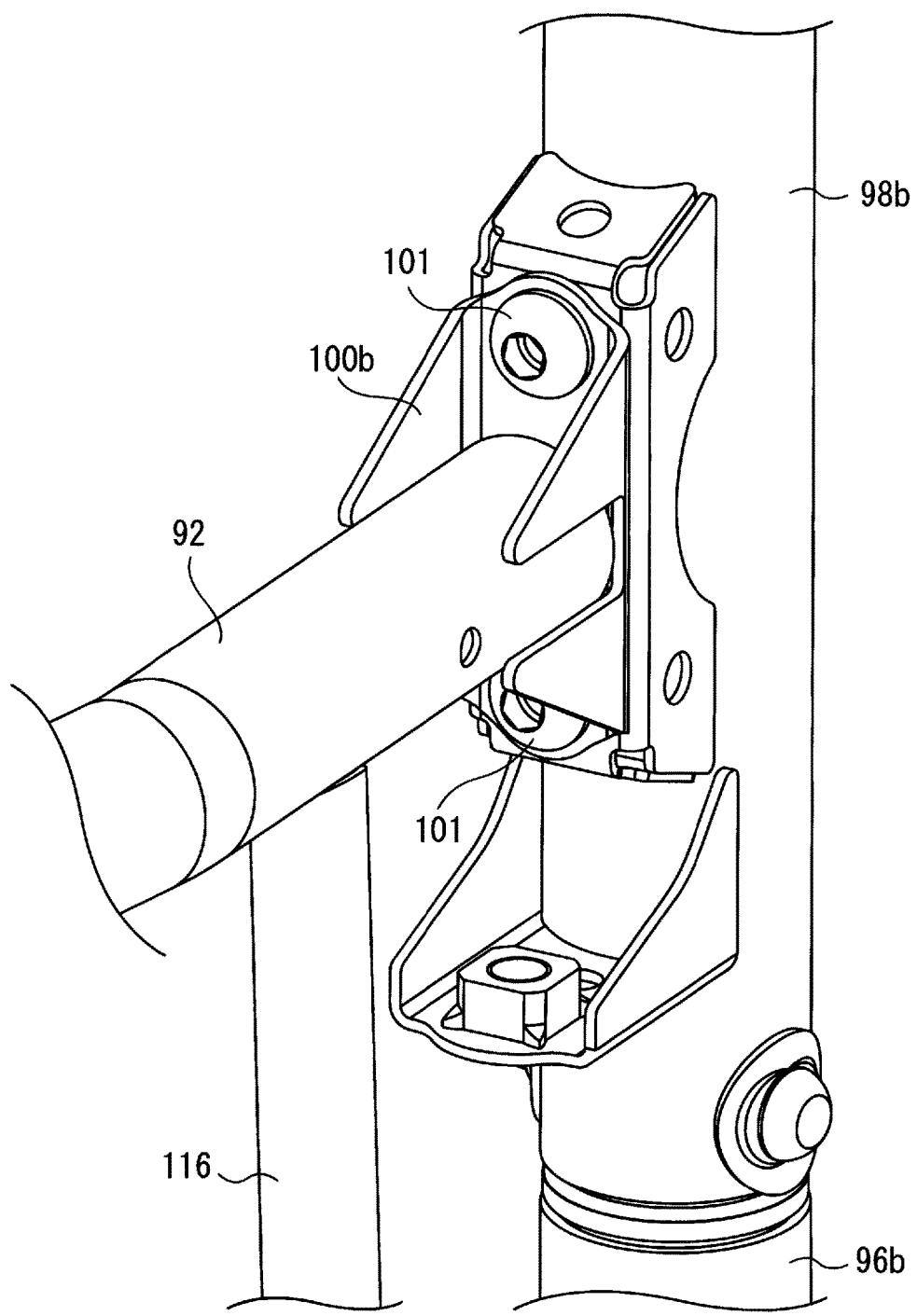
FIG. 11 an illustrative drawing showing an area of connection between the roll-over protection cage and the cross member.

Referring also to FIG. 9 and FIG. 10, the cross member 92 extends in the width direction (left-right direction) of the vehicle 10 between the front row 12 and the rear row 14; and includes a center portion (a portion corresponding to the seat portion 138 of the front row) in the width direction of the vehicle 10 that is U-shaped or substantially U-shaped in a plan view so that the center portion is located at a position more rearward than the remaining portions on its two sides. The cross member 92 connects the pair of support portions 90a, 90b to each other via connecting portions 100a, 100b. Referring to FIG. 6, FIG. 10, and FIG. 11, each of the connecting portions 100a, 100b is connected to a corresponding one of the upper support portions 98a, 98b using a plurality (two, in the present preferred embodiment) of fasteners (including bolts and nuts) 101, such that the cross member 92 is connected to the pair of support portions 90a, 90b at positions higher than centers, in the up-down direction, of the pair of support portions 90a, 90b. Although FIG. 11 shows the fasteners 101 only on the connecting portion 100b side, the same arrangement is provided on the connecting portion 100a side too.

On the cross member 92, mounting portions 102, 104, 106 protrude upward. The mounting portions 102, 104, 106 are respectively located to correspond to seat portions 136, 138, 140 in the seat unit 24 in the front row 12, which will be described below. Headrest portions 156, 160, 164 of the seat unit 24, which will be described below, are respectively attached to the mounting portions 102, 104, 106. Between the mounting portions 102 and 104, a first support portion 108 and a second support portion 110 are connected to the cross member 92. The first support portion 108 is U-shaped or substantially U-shaped and includes two end portions connected to the cross member 92. The second support portion 110 is U-shaped or substantially U-shaped and includes two end portions connected to the cross member 92. The first support portion 108 protrudes upward from the cross member 92, whereas the second support portion 110 protrudes downward from the cross member 92. In the present preferred embodiment, the second support portion 110 is provided on the cross member 92 so as to sandwich an area where the first support portion 108 is located on the cross member 92. The first support portion 108 includes an upper portion, and on a forward facing side thereof a mounting portion 112 is attached. The second support portion 110 includes a lower portion, and on a forward facing side thereof a mounting portion 114 is attached. The cross member 92 and the second support portion 110 are connected to each other by L-shaped or substantially L-shaped grab bars 116, 118. Specifically, the grab bar 116 includes one end portion attached to an end portion (left end portion) of the cross member 92, and another end portion attached to a left region in the second support portion 110. The grab bar 118 includes one end portion attached to another end portion (right end portion) of the cross member 92, and another end portion attached to a right region in the second support portion 110. Thus, the cross member 92, the second support portion 110, and the grab bar 116 define an annular structure, and the cross member 92, the second support portion 110, and the grab bar 118 define an annular structure thus fixing the grab bars 116, 118 rigidly to each other.

Figure 4:
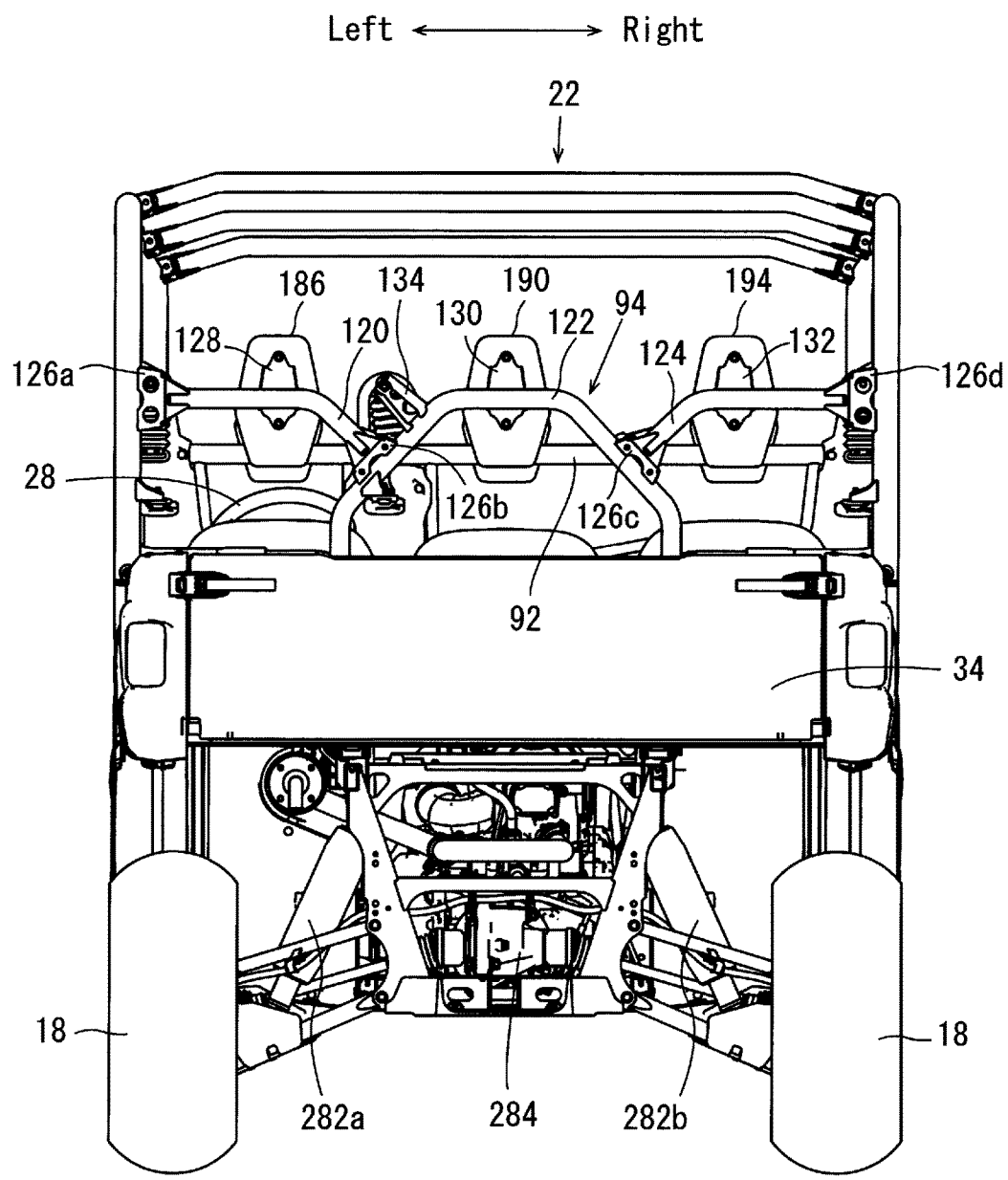
FIG. 4 is a rear view of the vehicle.
Figure 5:
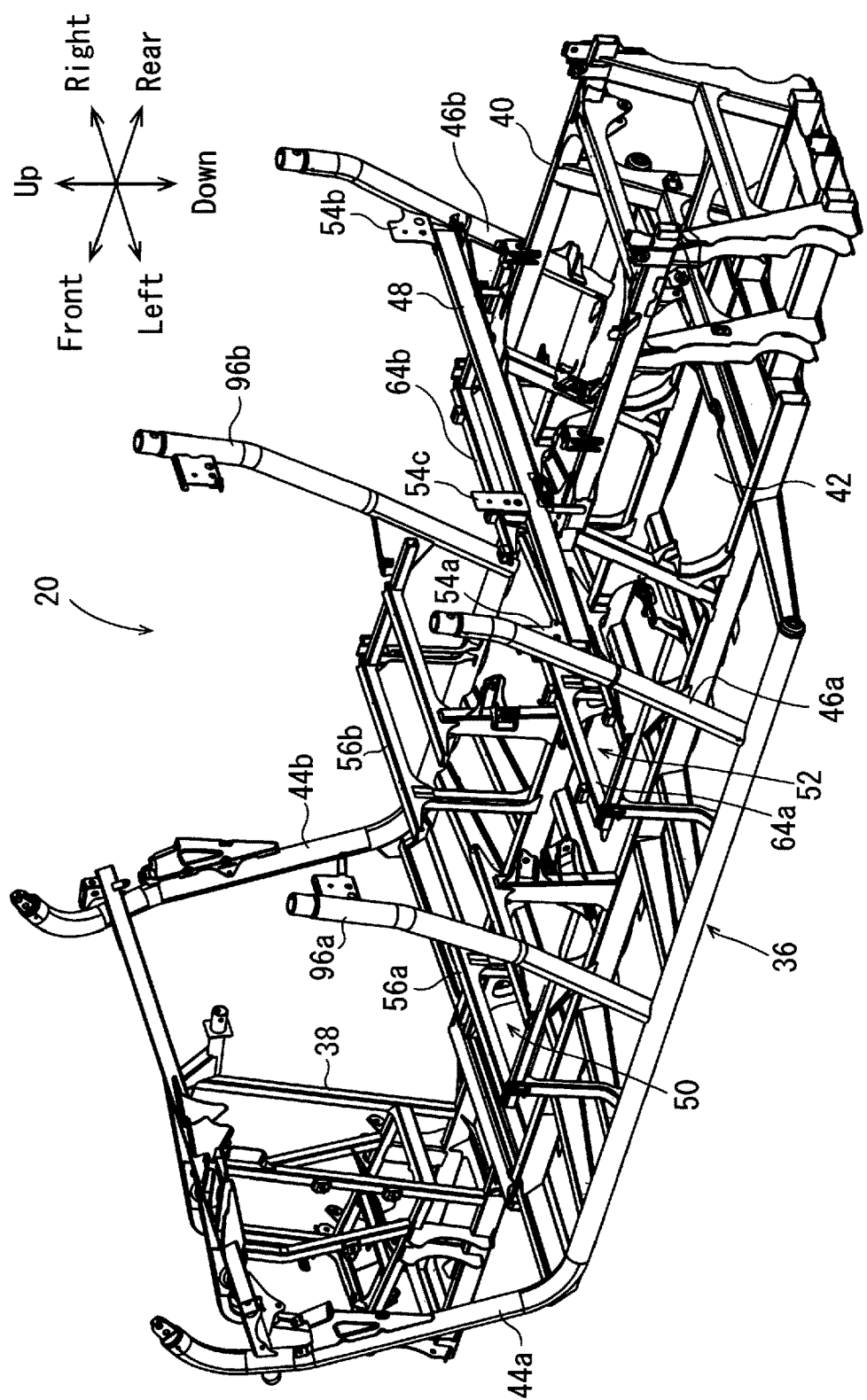
FIG. 5 is a perspective view of a frame portion.

Referring to FIG. 4 and FIG. 6, the cross member 94 extends in the width direction of the vehicle 10, and connects respective rear regions of the cage rear portions 82a, 82b of the roll-over protection cage 22 to each other. The cross member 94 includes support members 120, 122 and 124. The support member 122 is U-shaped or substantially U-shaped in a front view of the vehicle, and is located at a center region in the width direction of the vehicle 10. The support member 120 connects the support member 122 and the cage rear portion 82a to each other via connecting portions 126a, 126b, whereas the support member 124 connects the support member 122 and the cage rear portion 82b to each other via connecting portions 126c, 126d. Also, mounting portions 128, 130, 132 are fixed at respective center regions of the support members 120, 122, 124. To the mounting portions 128, 130, 132, headrest portions 186, 190, 194 of the seat unit 26 are respectively attached, which will be described below. Referring to FIG. 9 and FIG. 16, the support member 122 includes an upper end portion located at a position more rearward than the support members 120, 124. Therefore, the mounting portion 130 is located at a position more rearward than the mounting portions 128, 132. Also, on the support member 122, a mounting portion 134 extends obliquely upward between the mounting portion 130 and the connecting portion 126b (see FIG. 4). To the mounting portion 134, a shoulder anchor 260 (see FIG. 15), which will be described below is attached. Referring to FIG. 6, the support member 122 includes two end portions connected to the rear frame portion 40 via connecting portions 126e, 126f. Due to the arrangement described above, the cross member 94 is attached to the cage rear portions 82a, 82b of the roll-over protection cage 22 and to the rear frame portion 40 of the frame portion 20.

Referring to FIG. 9, FIG. 12, FIG. 13 and FIG. 16, the seat unit 24 in the front row 12 includes a plurality (for example, three, in the present preferred embodiment) of seat portions 136, 138, 140 arranged in the width direction of the vehicle 10. In the width direction of the vehicle 10, the seat portion 138 is located at a center of the seat unit 24. In other words, the seat portion 138 is adjacent to the seat portion 136 and is adjacent to the seat portion 140 in the width direction of the vehicle 10. When viewed from the seat portion 138, the seat portion 140 is located on a side spaced apart from the seat portion 136. Referring to FIG. 1 through FIG. 4, the steering wheel 28 is located in front of the seat portion 136. In other words, in the present preferred embodiment, the seat portion 136 is a seat portion for the driver, whereas the seat portions 138, 140 are seat portions for passengers. In the present preferred embodiment, the seat portions 136, 138, 140 represent the first seat portion, the second seat portion, and the third seat portion respectively.

The seat portion 136 includes a seat bottom portion 142 that supports a person from below, and a back support portion 144 that supports the person from behind. Likewise, the seat portion 138 includes a seat bottom portion 146 and a back support portion 148, and the seat portion 140 includes a seat bottom portion 150 and a back support portion 152. The back support portion 144 includes a seat back portion 154 that supports a back of a person, and a headrest portion 156 that supports a head portion of the person. Likewise, the back support portion 148 includes a seat back portion 158 and a headrest portion 160, whereas the back support portion 152 includes a seat back portion 162 and a headrest portion 164. The headrest portion 156 of the seat portion 136, the headrest portion 160 of the seat portion 138, and the headrest portion 164 of the seat portion 140 are attached to the mounting portions 102, 104 and 106 on the cross member 92, respectively. Since the mounting portion 104 is located at a position more rearward than the mounting portions 102, 106, the headrest portion 160 is located at a position more rearward than the headrest portions 156, 164.

Figure 15:
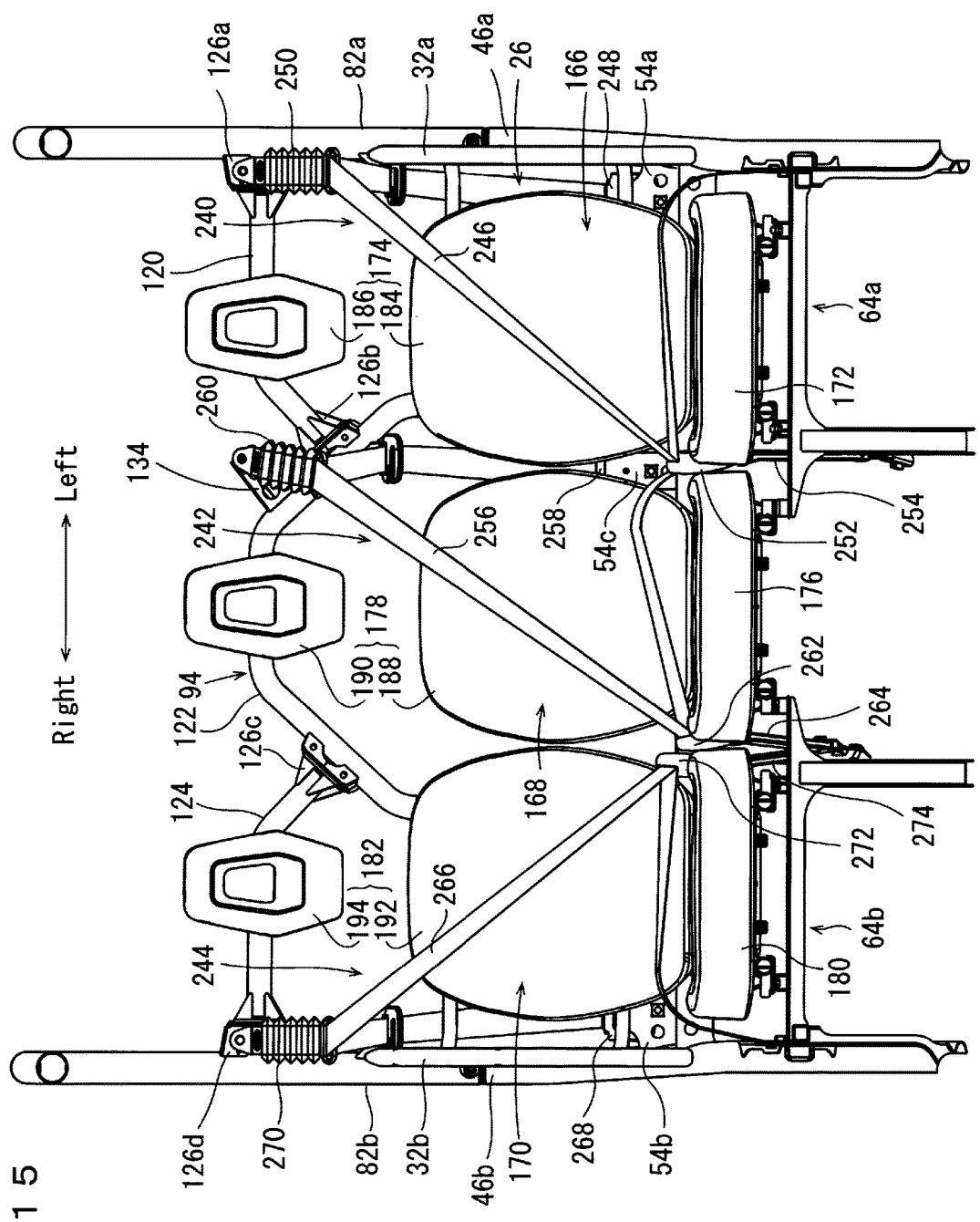
FIG. 15 is a front view showing a seat unit in the rear row, the seat belt units, the cross member, and their surroundings.
Figure 16:
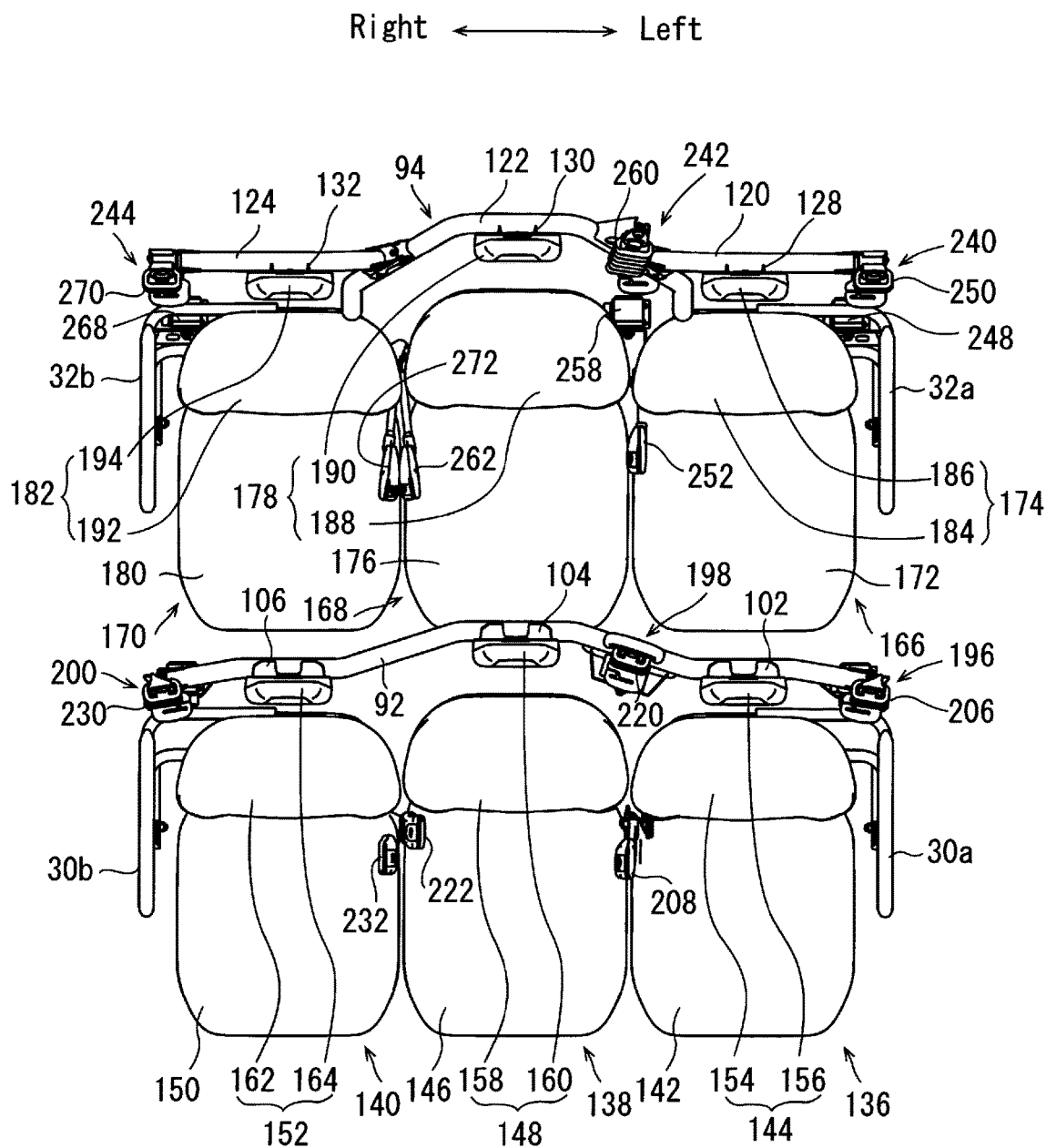
FIG. 16 is a plan view showing the seat units in the front row and the rear row, the seat belt units, the cross members, and their surroundings.

Referring to FIG. 9, FIG. 15, and FIG. 16, the seat unit 26 in the rear row 14 includes a plurality (for example, three, in the present preferred embodiment) of seat portions 166, 168, 170 arranged in the width direction of the vehicle 10. In the width direction of the vehicle 10, the seat portion 168 is located at a center of the seat unit 26. In other words, the seat portion 168 is adjacent to the seat portion 166 and is adjacent to the seat portion 170 in the width direction of the vehicle 10. When viewed from the seat portion 168, the seat portion 170 is on a side spaced apart from the seat portion 166. In the present preferred embodiment, the seat portions 166, 168, 170 are for passengers in the rear row 14.

The seat portion 166 includes a seat bottom portion 172 that supports a person from below, and a back support portion 174 that supports the person from behind. Likewise, the seat portion 168 includes a seat bottom portion 176 and a back support portion 178, and the seat portion 170 includes a seat bottom portion 180 and a back support portion 182. The back support portion 174 includes a seat back portion 184 that supports a back of the person, and a headrest portion 186 that supports a head portion of the person. Likewise, the back support portion 178 includes a seat back portion 188 and a headrest portion 190, and the back support portion 182 includes a seat back portion 192 and a headrest portion 194. The headrest portion 186 of the seat portion 166, the headrest portion 190 of the seat portion 168, and the headrest portion 194 of the seat portion 170 are attached to the mounting portions 128, 130, 132 on the cross member 94, respectively. Since the mounting portion 130 is located at a position more rearward than the mounting portions 128, 132, the headrest portion 190 is located at a position more rearward than the headrest portions 186, 194.

Referring to FIG. 1, FIG. 12, FIG. 15, and FIG. 16, the pair of shoulder bolsters 30a, 30b are arranged on respective outer sides at a left and a right end regions of the seat unit 24 in the front row 12. The pair of shoulder bolsters 32a, 32b are arranged on respective outer sides at a left and a right end regions of the seat unit 26 of the rear row 14.

Referring to FIG. 9, FIG. 12, FIG. 14 and FIG. 16, the vehicle 10 further includes a plurality (for example, three in the present preferred embodiment) of three-point seat belt units 196, 198, 200 for the front row 12. The seat belt units 196, 198, 200 correspond to the seat portions 136, 138, 140, respectively.

The seat belt unit 196 includes a belt member 202, a winding device 204 to wind the belt member 202, a shoulder anchor 206 that slidably supports the belt member 202 that is pulled out of the winding device 204, and a buckle portion 208 that fixes the belt member 202 by engaging a tongue (not illustrated) of the belt member 202. The winding device 204 is attached to an upper end portion of the lower support portion 96a via a bracket 210 at a position lower than the cross member 92. The shoulder anchor 206 is attached to a central region or a substantially central region, in the up-down direction, of the upper support portion 98a via a bracket 212, at a position higher than the cross member 92 but at a position lower than an upper end of the headrest portion 156. The winding device 204 and the shoulder anchor 206 are located at positions sandwiching the cross member 92 therebetween, with the winding device 204 disposed below the shoulder anchor 206. The buckle portion 208 is adjacent an upper surface of the seat bottom portion 142 of the seat portion 136 and adjacent an upper surface of the seat bottom portion 146 of the seat portion 138, and is connected to the frame lower portion 56a of the seat frame portion 50 via a connecting member 214. The buckle portion 208 is located at an obliquely downward position from the shoulder anchor 206 in the front view.

The seat belt unit 198 includes a belt member 216, a winding device 218 to wind the belt member 216, a shoulder anchor 220 that slidably supports the belt member 216 that is pulled out of the winding device 218, and a buckle portion 222 that fixes the belt member 216 by engagement with a tongue (not illustrated) of the belt member 216. The winding device 218 is attached to the second support portion 110, which is fixed to the cross member 92, via the mounting portion 114 at a position lower than the cross member 92. The winding device 218 is connected to a back surface of the mounting portion 114. The shoulder anchor 220 is attached to the first support portion 108, which is fixed to the cross member 92 via the mounting portion 112 at a position higher than the cross member 92 but lower than an upper end of the headrest portion 160. The shoulder anchor 220 is connected to a front surface of the mounting portion 112. The winding device 218 and the shoulder anchor 220 sandwich the cross member 92 therebetween. In other words, the cross member 92 is between an upper end of the shoulder anchor 220 and a lower end of the winding device 218 in the front view. The winding device 218 is located below the shoulder anchor 220. The winding device 218 is supported by the cross member 92 via the mounting portion 114 and the second support portion 110, whereas the shoulder anchor 220 is supported by the cross member 92 via the mounting portion 112 and the first support portion 108. The buckle portion 222 is adjacent an upper surface of the seat bottom portion 146 of the seat portion 138 and adjacent an upper surface of the seat bottom portion 150 of the seat portion 140, and is connected to the frame lower portion 56b of the seat frame portion 50 via a connecting member 224. The buckle portion 222 is located at an obliquely downward position from the shoulder anchor 220 in the front view.

The seat belt unit 200 includes a belt member 226, a winding device 228 to wind the belt member 226, a shoulder anchor 230 that slidably supports the belt member 226 that is pulled out of the winding device 228, and a buckle portion 232 that fixes the belt member 226 by engaging a tongue (not illustrated) of the belt member 226. The winding device 228 is attached to an upper end portion of the lower support portion 96b via a bracket 234 at a position lower than the cross member 92. The shoulder anchor 230 is attached to a central region or substantially central region, in the up-down direction, of the upper support portion 98b via a bracket 236 at a position higher than the cross member 92 but at a position lower than an upper end of the headrest portion 164. The winding device 228 and the shoulder anchor 230 are located at positions sandwiching the cross member 92 therebetween, with the winding device 228 disposed below the shoulder anchor 230. The buckle portion 232 is adjacent an upper surface of the seat bottom portion 146 of the seat portion 138 and adjacent an upper surface of the seat bottom portion 150 of the seat portion 140, and is connected to the frame lower portion 56b of the seat frame portion 50 via a connecting member 238. The buckle portion 232 is located obliquely below the shoulder anchor 230 in the front view.

Figure 12:
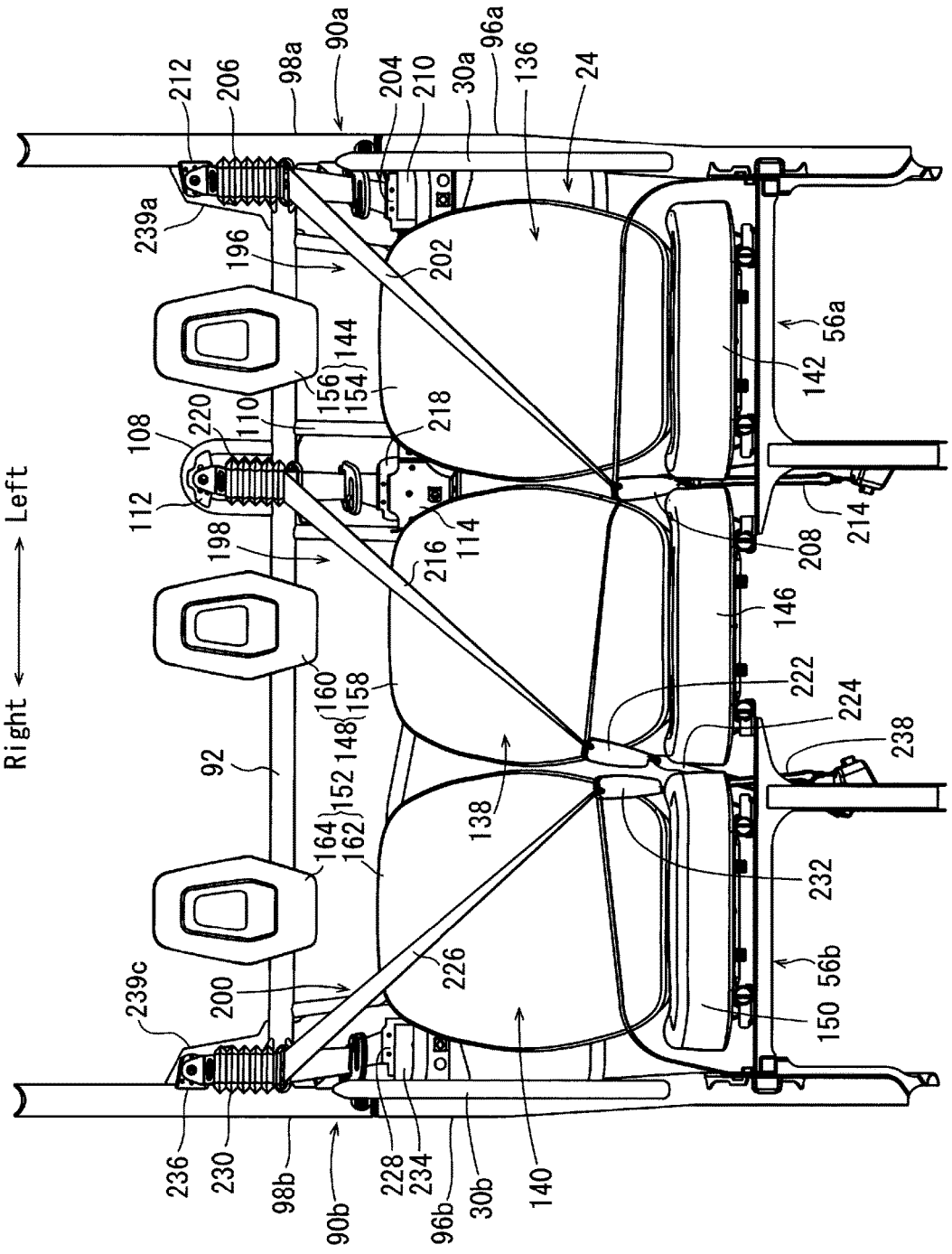
FIG. 12 is a front view showing a seat unit in the front row, seat belt units, the cross member, and their surroundings.
Figure 13:
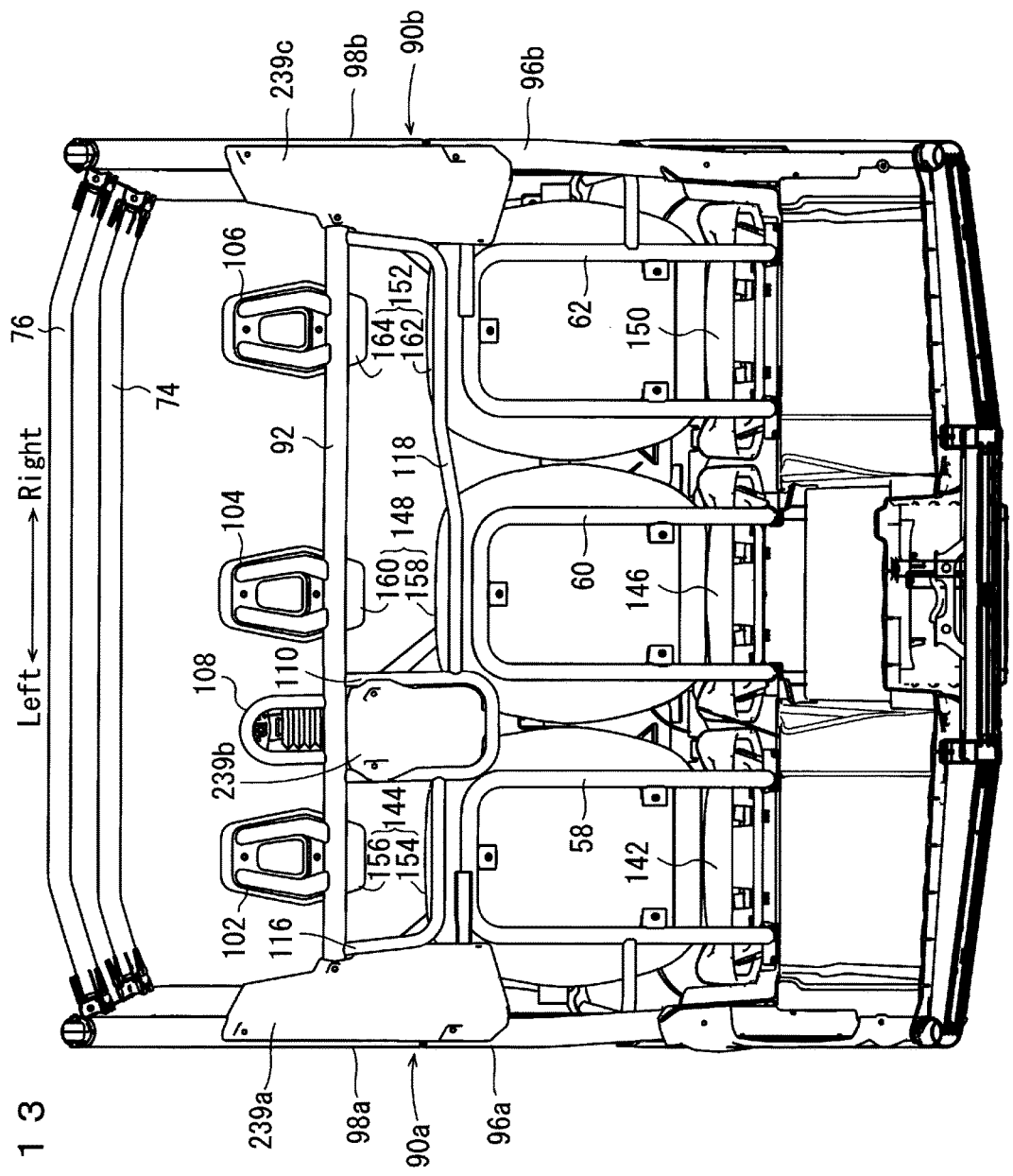
FIG. 13 is a rear view showing the seat unit in the front row, the cross member, and their surroundings.
Figure 14:
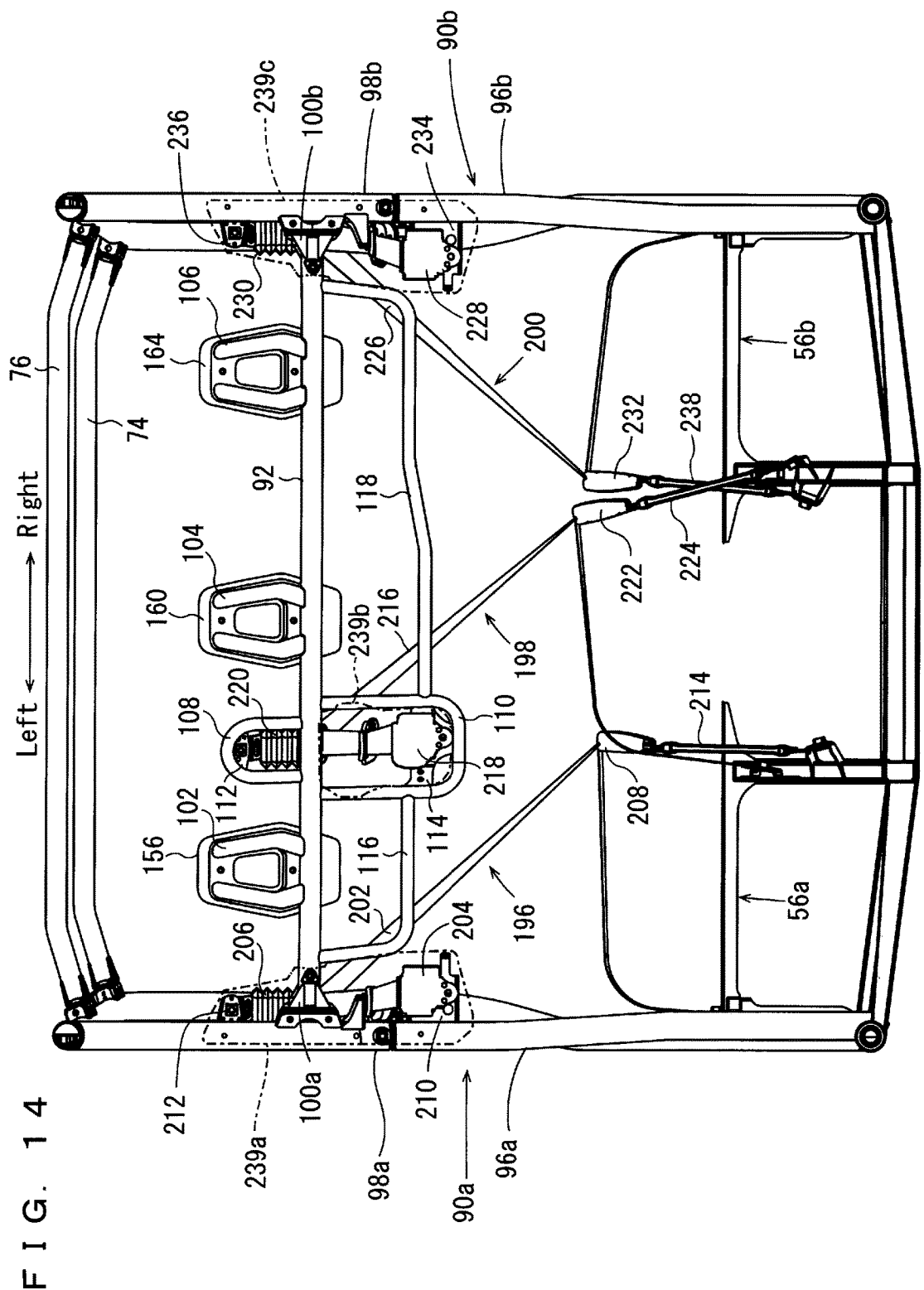
FIG. 14 is a rear view showing the seat belt units in the front row, the cross member, and their surroundings.

Referring to FIG. 12 through FIG. 14, the winding device 204 and the shoulder anchor 206 of the seat belt unit 196 are covered from behind by a cover member 239a. The cover member 239a is attached to the lower support portion 96a and the upper support portion 98a of the support portion 90a. The winding device 218 of the seat belt unit 198 is covered from behind by a cover member 239b. The cover member 239b is attached to the second support portion 110. The winding device 228 and the shoulder anchor 230 of the seat belt unit 200 are covered from behind by a cover member 239c. The cover member 239c is attached to the lower support portion 96b and the upper support portion 98b of the support portion 90b.

Referring to FIG. 9, FIG. 15, and FIG. 16, the vehicle 10 further includes a plurality (for example, three in the present preferred embodiment) of three-point seat belt units 240, 242, 244 for the rear row 14. The seat belt units 240, 242, 244 correspond to the seat portions 166, 168, 170, respectively.

The seat belt unit 240 includes a belt member 246, a winding device 248 to wind the belt member 246, a shoulder anchor 250 that slidably supports the belt member 246 that is pulled out of the winding device 248, and a buckle portion 252 that fixes the belt member 246 by engaging a tongue (not illustrated) of the belt member 246. The winding device 248 is attached to a central region or substantially central region in the up-down direction, of the support frame portion 46a of the main frame portion 36, and to a left end region of the cross member 48 via a bracket 54a (see FIG. 5) adjacent a rear end of the seat bottom portion 172 of the seat portion 166. The shoulder anchor 250 is attached to a left end region of the support member 120 of the cross member 94 and to a central region or substantially central region, in the up-down direction, of the cage rear portion 82a of the side cage portion 72a via a connecting portion 126a at a position lower than an upper end of the headrest portion 186. The winding device 248 is located below the shoulder anchor 250. The buckle portion 252 is adjacent an upper surface of the seat bottom portion 172 of the seat portion 166 and adjacent an upper surface of the seat bottom portion 176 of the seat portion 168, and is connected to the frame lower portion 64a of the seat frame portion 52 via a connecting member 254. The buckle portion 252 is located obliquely below the shoulder anchor 250 in the front view.

The seat belt unit 242 includes a belt member 256, a winding device 258 to wind the belt member 256, a shoulder anchor 260 that slidably supports the belt member 256 that is pulled out of the winding device 258, and a buckle portion 262 that fixes the belt member 256 by engaging a tongue (not illustrated) of the belt member 256. The winding device 258 is attached to a region of the cross member 48 that is slightly to the left of center in the width direction of the vehicle 10 (between the seat portions 166 and 168 in the front view) via a bracket 54c (see FIG. 5) adjacent a rear region of the seat bottom portion 176 of the seat portion 168. The shoulder anchor 260 is attached to the support member 122 of the cross member 94 via the mounting portion 134 at a position lower than an upper end of the headrest portion 190. The winding device 258 is located below the shoulder anchor 260. The buckle portion 262 is adjacent an upper surface of the seat bottom portion 176 of the seat portion 168 and adjacent an upper surface of the seat bottom portion 180 of the seat portion 170, and is connected to the frame lower portion 64b of the seat frame portion 52 via a connecting member 264. The buckle portion 262 is located obliquely below the shoulder anchor 260 in the front view.

The seat belt unit 244 includes a belt member 266, a winding device 268 to wind the belt member 266, a shoulder anchor 270 that slidably supports the belt member 266 that is pulled out of the winding device 268, and a buckle portion 272 that fixes the belt member 266 by engaging a tongue (not illustrated) of the belt member 266. The winding device 268 is attached to a central region or substantially central region, in the up-down direction, of the support frame portion 46b of the main frame portion 36, and to a right end region of the cross member 48 via a bracket 54b (see FIG. 5) adjacent a rear end of the seat bottom portion 180 of the seat portion 170. The shoulder anchor 270 is attached to a right end region of the support member 124 of the cross member 94, and to a central region or substantially central region, in the up-down direction, of the cage rear portion 82*b* of the side cage portions 72*b* via a connecting portion 126*d* at a position lower than an upper end of the headrest portion 194. The winding device 268 is located below the shoulder anchor 270. The buckle portion 272 is located adjacent an upper surface of the seat bottom portion 176 of the seat portion 168 and adjacent an upper surface of the seat bottom portion 180 of the seat portion 170, and is connected to the frame lower portion 64*b* of the seat frame portion 52 via a connecting member 274. The buckle portion 272 is located obliquely below the shoulder anchor 270 in the front view.

Returning to FIG. 1 through FIG. 4, the vehicle 10 further includes a pair of suspension assemblies 276*a*, 276*b* that suspend the pair of front wheels 16; an engine 278; a rotation transmission portion 280 that transmits rotation of the engine 278 to the pair of front wheels 16; a pair of suspension assemblies 282*a*, 282*b* that suspend the pair of rear wheels 18; and a rotation transmission portion 284 that transmits rotation of the engine 278 to the pair of rear wheels 18. The front frame portion 38 supports the pair of suspension assemblies 276*a*, 276*b* and the rotation transmission portion 280. The rear frame portion 40 supports the engine 278, the pair of suspension assemblies 282*a*, 282*b*, and the rotation transmission portion 284. Therefore, the front frame portion 38 supports the pair of front wheels 16 via the pair of suspension assemblies 276*a*, 276*b*, whereas the rear frame portion 40 supports the pair of rear wheels 18 via the pair of suspension assemblies 282*a*, 282*b*. In the present preferred embodiment, the suspension assemblies 276*a*, 276*b*, 282*a*, 282*b* preferably include a double wishbone type suspension assembly, for example. The cargo bed 34 is also supported by the rear frame 40.

The vehicle 10 further includes a transfer mechanism 286 that transmits movements of the steering wheel 28 to the pair of front wheels 16. The transfer mechanism 286 is preferably any appropriate conventional rack and pinion type transfer mechanism, for example.

According to the vehicle 10 described above, the frame portion 20 and the roll-over protection cage 22 are connected by the pair of support portions 90*a*, 90*b* that extend in the up-down direction and are connected to each other by the cross member 92. This makes it possible to improve the rigidity of the vehicle 10 as a whole and to securely fix the cross member 92 in the vehicle 10 even if the vehicle 10 is increased in size in the fore-aft direction by including the front row 12 and the rear row 14 arranged in the fore-aft direction. In addition, the cross member 92 that is securely fixed to the vehicle 10 is located between an upper end of the shoulder anchor 220 and a lower end of the winding device 218 in the front view. Therefore, it is possible to dispose both of the shoulder anchor 220 and the winding device 218 adjacent the cross member 92, and to securely support the shoulder anchor 220 and the winding device 218 by the cross member 92. The cross member 92 extends in the width direction of the vehicle 10 between the front row 12 and the rear row 14, while the cross member 92 connects the pair of support portions 90*a*, 90*b* to each other at positions higher than their centers, in the up-down direction, of the pair of support portions 90*a*, 90*b*. This makes it possible to dispose the cross member 92 sufficiently above the seat surfaces (upper surfaces of the seat bottom portions 172, 176, 180) of the seat portions 166, 168, 170 in the rear row 14. As a result, it is also possible to dispose the winding device 218, which is located at a position lower than the cross member 92, sufficiently above the seat surfaces (upper surfaces of the seat bottom portions 172, 176, 180) of the seat portions 166, 168, 170 in the rear row 14. In other words, neither of the cross member 92 and the winding device 218 is disposed at a position lower than the knees of the passengers sitting in the rear row 14, and the arrangement ensures passenger comfort in the rear row 14 (see FIG. 7 and FIG. 13).

Each of the first support portion 108 and the second support portion 110 is securely connected to the cross member 92 at two locations, i.e., at both end portions thereof. Also, each of the first support portion 108 and the second support portion 110 is preferably U-shaped or substantially U-shaped. This makes it possible to attach the shoulder anchor 220 to the first support portion 108 so as not to protrude outward beyond an outer perimeter of the first support portion 108, and to attach the winding device 218 to the second support portion 110 so as not to protrude outward beyond an outer perimeter of the second support portion 110. Therefore, it is possible to protect the shoulder anchor 220 and the winding device 218.

Each of the grab bars 116, 118 includes one end portion attached to the cross member 92. This fixes the position of these end portions of the grab bars 116, 118, preventing the grab bars 116, 118 from protruding in the width direction of the vehicle 10. The grab bars 116, 118 include other end portions attached to the second support portion 110. This arrangement mutually enhances the connection strength of the grab bars 116, 118 and the second support portion 110 to the cross member 92.

Since the support portions 90*a*, 90*b* and the cross member 92 are connected by the fasteners 101, it is easy to remove the cross member 92 from the support portions 90*a*, 90*b* when the vehicle 10 is to be transported. This makes transportation of the vehicle 10 easy.

The seat portion 138 includes the headrest portion 160, and the cross member 92 overlaps the headrest portion 160 in the front view. Therefore, it becomes possible to easily support the headrest portion 160 of the seat portion 138 in the front row 12 by the cross member 92.

In the width direction of the vehicle 10, the shoulder anchor 220 and the winding device 218 are located adjacent the seat portion 136. In other words, the shoulder anchor 220 and the winding device 218 are located on a side closer to the seat portion 136 when viewed from the seat portion 138. Therefore, this arrangement sufficiently reduces sway of the passenger sitting in the seat portion 138 toward the seat portion 136. Thus, the driver drives the vehicle 10 more comfortably.

In the preferred embodiments described above, description was made for a case where the seat unit 24 preferably includes a plurality of seat portions 136, 138, 140 that are individual components from each other, and the seat unit 26 includes a plurality of seat portions 166, 168, 170 that are individual components from each other, for example. However, the seat unit may include a plurality of seat portions that are integral with each other. Therefore, preferred embodiments of the present invention are also applicable to vehicles that include bench seats.

In the preferred embodiments described above, description was made for a case where the seat back portion and the headrest portion are separate from each other and defined by individual elements. However, the seat back portion and the headrest portion may be integral with each other.

In the preferred embodiments described above, description was made for a case where the seat unit 24 preferably includes three seat portions 136, 138, 140, and the seat unit 26 includes three seat portions 166, 168, 170. However, the number of the seat portions in the seat unit is not limited to the preferred embodiments described above. For example, the seat unit may include four or more seat portions.

In the preferred embodiments described above, description was made for a case where the vehicle 10 preferably includes a pair of rear wheels 14. However, the vehicle may include two or more pairs of rear wheels.

The present invention being thus far described in terms of preferred embodiments, preferred embodiments of the present invention may be varied in many ways within the scope and the spirit of the present invention. The scope of the present invention is only limited by the accompanied claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of front wheels;
a pair of rear wheels;
a frame supporting the pair of front wheels and the pair of rear wheels;
a first seat portion, a second seat portion, and a third seat portion supported by the frame and arranged side by side in a width direction of the vehicle;
a fourth seat portion, a fifth seat portion, and a sixth seat portion located at a position more rearward than the first seat portion, the second seat portion, and the third seat portion, respectively, supported by the frame and arranged side by side in the width direction of the vehicle;
a steering wheel located in front of the first seat portion such that a driver sitting in the first seat portion faces the steering wheel;
a roll-over protection cage disposed above the first seat portion, the second seat portion, and the third seat portion, and supported by the frame;
a pair of supports extending in an up-down direction of the vehicle, disposed on a left side and a right side in the width direction of the vehicle, and connecting the frame and the roll-over protection cage to each other;
a cross member connecting the pair of supports to each other and including a center portion in the width direction of the vehicle, the center portion corresponding to a location of the second seat portion and extending rearward to a position that is more rearward than side portions of the cross member on respective sides of the center portion; and
a seat belt corresponding to the second seat portion; wherein
the first seat portion includes a first seat bottom and a first seat back;
the second seat portion includes a second seat bottom and a second seat back;
the third seat portion includes a third seat bottom and a third seat back;
the second seat portion is located between the first seat portion and the third seat portion;
the second seat bottom is separate from the first seat bottom and the third seat bottom;
the second seat back is separate from the first seat back and the third seat back;
the fourth seat portion includes a fourth seat bottom and a fourth seat back;
the fifth seat portion includes a fifth seat bottom and a fifth seat back;
the sixth seat portion includes a sixth seat bottom and a sixth seat back;
the fifth seat portion is located between the fourth seat portion and the sixth seat portion;
the fifth seat bottom is separate from the fourth seat bottom and the sixth seat bottom;
the fifth seat back is separate from the fourth seat back and the sixth seat back; and
the seat backs in a front row of seats including the first seat portion, the second seat portion, and the third seat portion are located at or adjacent to the pair of supports in a fore-aft direction of the vehicle, and the seat backs in a rear row of seats including the fourth seat portion, the fifth seat portion, and the sixth seat portion are located at or adjacent to a pair of support frames, which extend in the up-down direction of the vehicle from the frame, in the fore-aft direction of the vehicle.

2. The vehicle according to claim 1, wherein the seat belt is a three-point seat belt.

3. The vehicle according to claim 1, wherein
the first seat portion includes a first headrest;
the third seat portion includes a third headrest; and
the first headrest and the third headrest are attached to the cross member.

4. The vehicle according to claim 1, wherein the roll-over protection cage is disposed above the fourth seat portion, the fifth seat portion, and the sixth seat portion.

5. The vehicle according to claim 1, further comprising a three-point seat belt corresponding to the fifth seat portion.

6. The vehicle according to claim 1, wherein the cross member extends in the width direction of the vehicle between the front row of seats and the rear row of seats.

7. The vehicle according to claim 1, wherein each of the pair of supports includes a lower support and an upper support.

8. The vehicle according to claim 1, wherein the roll-over protection cage includes a pair of cage sides extending in the fore-aft direction of the vehicle, and roof members connecting the pair of cage sides to each other.

* * * * *